Figure 1:
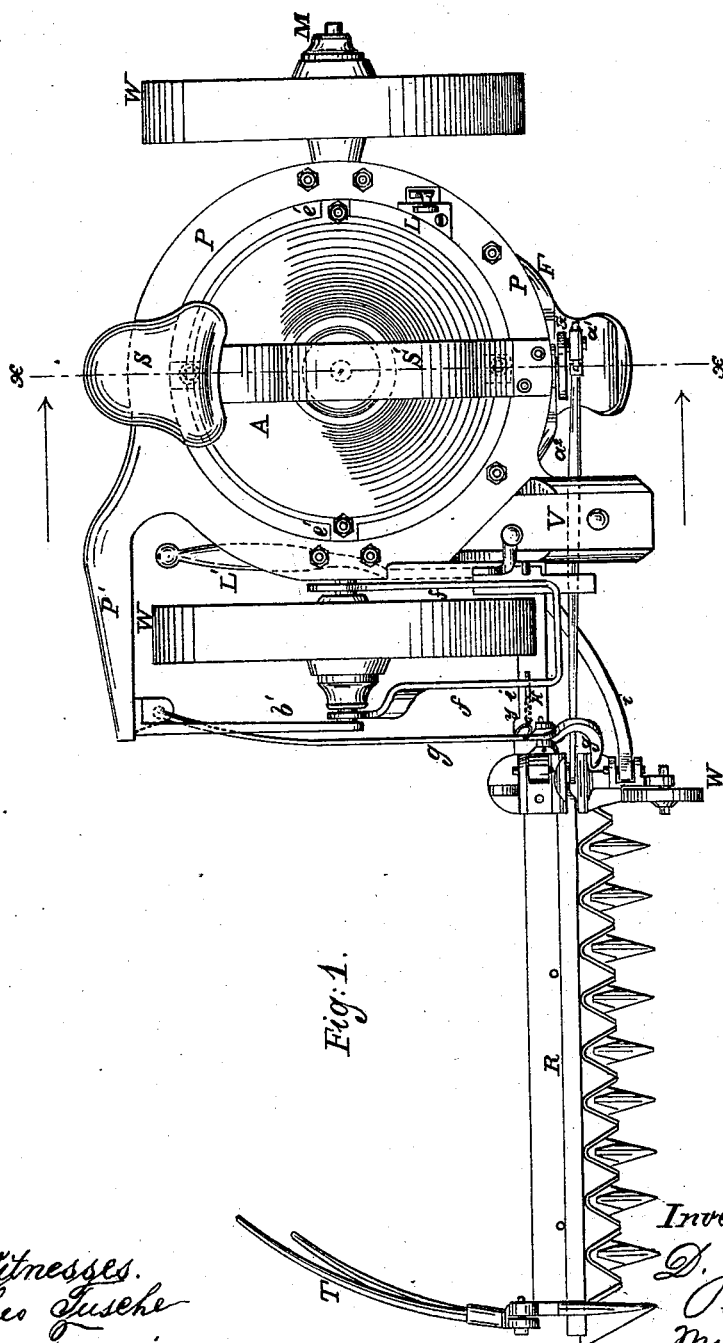
Figure 2:
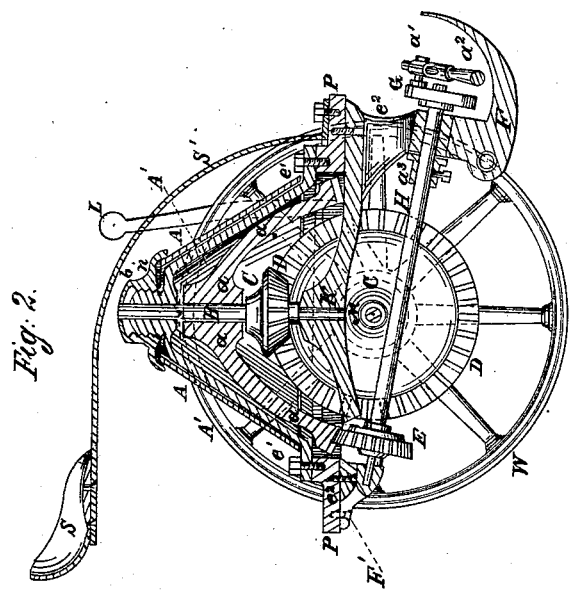

D. BABCOCK.
Mower and Reaper.

No. 79,300.

2 Sheets—Sheet 2.

Patented June 30, 1868.

Witnesses.
Theo. Tusche
Wm Trewin

Inventor,
D Babcock
Per Munn & Co
Attorneys.

United States Patent Office.

DARIUS BABCOCK, OF WARSAW, ILLINOIS.

Letters Patent No. 79,300, dated June 30, 1868.

IMPROVEMENT IN HARVESTERS.

The Schedule referred to in these Letters Patent and making part of the same.

TO ALL WHOM IT MAY CONCERN:

Be it known that I, DARIUS BABCOCK, of Warsaw, in the county of Hancock, and State of Illinois, have invented a new and improved Mower and Reaper; and I do hereby declare that the following is a full, clear, and exact description thereof, which will enable those skilled in the art to make and use the same, reference being had to the accompanying drawings forming part of this specification.

This invention relates to a new and improved method of constructing machinery for mowing and reaping, whereby the same is more economically done, and whereby, also, the machines are made more certain in their action, and are rendered more durable and less likely to get out of repair.

It consists of a circular frame, supported by an axle and wheels in the ordinary way, upon which said axle is a bevelled-gear wheel, engaging with a bevelled-gear pinion on a vertical shaft supported by said frame.

Upon said shaft is a crown-geared wheel, engaging with a pinion on a horizontal shaft, also supported by said frame, to which said horizontal shaft a wheel and crank are attached, by means of which the cutters are operated.

It consists also of a frame pivoted to the axle, operated by a lever.

To said frame is attached a chain, which said chain is attached, by the other end of the same, to an arm, which supports the flexible bar of the machine, so that the same may be raised when necessary.

It consists also of a hook, attached to a brace on an arm on said circular frame, so constructed and arranged as to prevent the flexible bar of the machine from rolling up, and also to serve as a guide for the flexible bar of the machine when the same is folded up on the machine.

The difference between a machine for mowing and reaping, having my improvement, and the machines now in common use, consists in the arrangement of the gearing in connection with the driving-wheels of the machine, and the hook attached to the frame of the machine, for the purpose above specified, and in the frame for raising the flexible bar of the machine from the ground.

In the accompanying plate of drawings—

Plate 1 is a plan view of my invention.

Plate 2 represents a central vertical side section of the same, taken in the line $x\,x$, plate 1.

Similar letters of reference indicate corresponding parts.

Upon the axle M, and rigidly secured to the same in a horizontal plane, is an annular frame, P, said frame P being provided with an arm, P', extending outward and beyond one of the wheels W, as shown in the drawing, plate 1, to which is secured the brace $b'$, said brace $b'$ extending from the end of the arm P' to one end of the axle M, by means of which said brace $b'$ said arm P' is strengthened and protected.

Said frame P is also provided with another arm, V, so constructed as to receive the pole or tongue, by means of which the entire machine is drawn, said pole or tongue being secured to the arm V, so as that the same may be readily removed.

Upon said frame P, so as to coincide nearly with the same, is bolted, by the bolts $e^1$, the dome-shaped frame A'.

Said frame A' consists of a circular flange, to which are attached four or more inclined braces or supports, terminating at the top in a circular solid piece, $b$, said flange, and said braces, and said piece $b$, being cast in one piece, so as to form a frame in the shape of a dome or truncated cone, as shown in the drawing, said piece $b$ being provided with a screw-thread, so as to receive the nut $n$, as shown.

Across the frame P, and on the under side of the same, extending from one side of said frame to the other, through a diameter of said frame P, is a cross-bar or support, K.

Said cross-bar K is bent, so as to pass over the axle M, so as not to touch the same, said cross-bar K being provided with an upright or step to receive the lower end of the vertical shaft B, said upright being on the centre of said cross-bar, and directly over the axle M, as shown.

Upon the vertical shaft B, and near the upper end of the same, and keyed securely thereto, in the ordinary way, is the crown-wheel $a$.

Said crown-wheel $a$ is a geared wheel, slightly bevelled, having a diameter as great as will turn within the frame A', and conforms in shape, as shown in the drawing, to the frame A'.

Upon the shaft B, and directly under the attachment of the crown-wheel $a$ to the same, is a bevelled-gear pinion, C, secured to the shaft B with a key in the ordinary way, having the teeth on the under side of the same, as shown.

Upon said axle M, and near one end of the same, and keyed to the same in the ordinary way, is the bevelled-gear wheel D, having its teeth on the side of the same towards the pinion C, and fitting into the same, in the ordinary way of changing a horizontal to a vertical motion.

Said wheel D is of such diameter as that it will rotate within the rim of the crown-wheel $a$, and so that the rim of the crown-wheel $a$ will revolve about its centre without interfering with the wheel D.

Over the frame A' is the dome A, which is held down into its place by the nut $n$, fitting upon the screw-thread on the part $b$ of frame A', as shown.

The shaft B is supported at its upper end by the piece $b$ of the frame A'.

Upon the frame P, and secured to the same by the screw $c^2$, is a support, F, provided with suitable boxes to receive the journal on one end of the shaft H, and in which said boxes said shaft H turns.

Upon the opposite side of the frame P, and at the rear of the machine, and secured to said frame P by suitable bolts, is a frame or support, F', upon which said frame, and in such a way as to allow the shaft H a slight inclination downward and forward, are suitable boxes or bearings, $a^3$, and in which said boxes $a^3$ the shaft H turns.

Upon said shaft H, and near the back end of the same, is a geared pinion, E, slightly bevelled, so as to fit into the crown-wheel $a$, as shown, by which said crown-wheel $a$ and said pinion E said shaft H is driven in the ordinary way of changing the motion of a vertical shaft to a shaft slightly inclined from a horizontal line.

Upon the other or front end of the shaft H, and keyed thereto in the ordinary way, is a wheel, G.

In the wheel G, and secured thereto in the ordinary way, at a distance from the centre of the same equal to the length of motion required for the cutters, is the crank-pin $a^1$, by means of which and the connecting-rod, $a^2$, the cutters in the flexible bar of the machine are driven in the ordinary way, as shown.

Through an eye in the end of the brace $b'$, which is secured to the arm P' of the frame P, is pivoted the hook $g$, extending from the said eye forward, where it is pivoted to the bar $i$ near the point where the flexible bar R is pivoted to the same, and extending forward still beyond the point of the attachment of the same to bar $i$, where it terminates in a hook bent downward, the point or end of which reaches down on to shoe in such a way, as shown in the drawing, as to prevent said flexible bar from lifting or rolling up.

Said hook $g$ having also the purpose of guiding the flexible bar R, so that the same may be at any time folded up without adjusting the cutters as now.

Upon the axle M, and upon the same end of the machine as the arm P', and so as to reach around the rim of the wheel, as shown, is pivoted a frame, extending from the axle M, on one side of the wheel W, to the axle M again on the other or inside of the wheel W, as shown in the drawing, plate 1.

To the front end of said frame is attached a chain from one end of the same, the other end of the same being attached to the hook $g$.

Upon the under side of the frame P is pivoted the bent lever L', upon one, or the shorter, arm of which the frame $f$ rests, so that, by the operator moving the other arm of the lever, the front end of the frame is raised, and, by means of the chain attached to said frame and said hook $g$, the arm $i$ is also raised, so that the said arm $i$ and the flexible bar R may be raised above any obstruction by which it can be injured.

The flexible bar R may be of any one of those now commonly in use, as the Buckeye flexible bar, having the Hussey open guard attached to the same, and the track-clearer attached to the outer end, as now in ordinary use, and operated as above described.

The machine is made of cast iron, or wrought iron, or of both wrought and cast iron combined, or of other suitable material.

The operation is readily seen from the drawing, motion from the wheels of the machine W being communicated, through the wheels D, and pinion C, and crown-wheel $a$, and pinion E, and shaft H, to the cutters in the flexible bar R, said bar being raised by the lever L', and the same being prevented from rolling over by the hook $g$.

Constructed as above described, it constitutes a neat and durable mowing and reaping-machine, by means of which grass is more rapidly cut or grain more rapidly reaped; and the gearing being above the axle, the same is less likely to be injured.

I claim as new, and desire to secure by Letters Patent—

1. The dome-shaped frame A', in combination with the dome A, and in combination with any mowing and reaping-machinery, substantially as shown and described, and for the purposes set forth.

2. The annular frame P, in combination with the frame A' and the axle M, substantially as shown and described, and for the purposes set forth.

3. The combination of the axle M, gear-wheel D, pinion C, shaft B, crown-wheel $a$, pinion E, and shaft H, with the frame P, all constructed, arranged, and operating, substantially as and for the purposes set forth.

4. The frame $f$, in combination with the lever L', and chain, and arm $i$, substantially as shown and described, and for the purposes set forth.

5. The hook $g$, in combination with the arm $i$, and any flexible bar R, substantially as shown and described, and for purposes set forth.

The above specification of my invention signed by me, this twenty-fourth day of October, 1867.

DARIUS BABCOCK.

Witnesses:
  GEO. H. PALMER,
  WM. F. McNAMARA.